United States Patent [19]

Crabb, Jr.

[11] Patent Number: 4,484,448

[45] Date of Patent: Nov. 27, 1984

[54] LIQUID ICE INJECTION SYSTEM

[75] Inventor: Richard V. Crabb, Jr., Aromas, Calif.

[73] Assignee: Growers Ice Company, Salinas, Calif.

[21] Appl. No.: 516,645

[22] Filed: Jul. 25, 1983

[51] Int. Cl.³ .............................................. F25D 17/02
[52] U.S. Cl. ........................................... 62/64; 62/60; 62/237; 62/376
[58] Field of Search ................... 62/60, 64, 237, 373, 62/376

[56] References Cited

U.S. PATENT DOCUMENTS

| 2,751,882 | 6/1956 | Coyner | 62/64 |
| 4,249,388 | 2/1981 | Burns | 62/374 |
| 4,380,908 | 4/1983 | Crabb, Jr. | 62/373 |
| 4,425,768 | 1/1984 | Burns | 62/237 |
| 4,434,623 | 3/1984 | Weasel, Jr. | 62/64 |

Primary Examiner—Ronald C. Capossela
Attorney, Agent, or Firm—Gerald L. Moore

[57] ABSTRACT

A system for injecting liquid ice into a stack of individual produce holding cartons (12) having openings (14) therein, comprising a plurality of side walls (20, 25, 27) positioned to enclose the carton stack in a position over a holding tank (18). The side walls include channels (31) into which liquid ice is pumped by a pump (36) through hoses (35) to a pair of manifolds (34) connecting with the channels. The carton stack on a pallet (11) is placed on a pallet tray (15) and shifted to a position between the side walls, the side walls are moved into close contact with the carton stack and liquid ice is pumped into the cartons to ice the produce.

8 Claims, 3 Drawing Figures

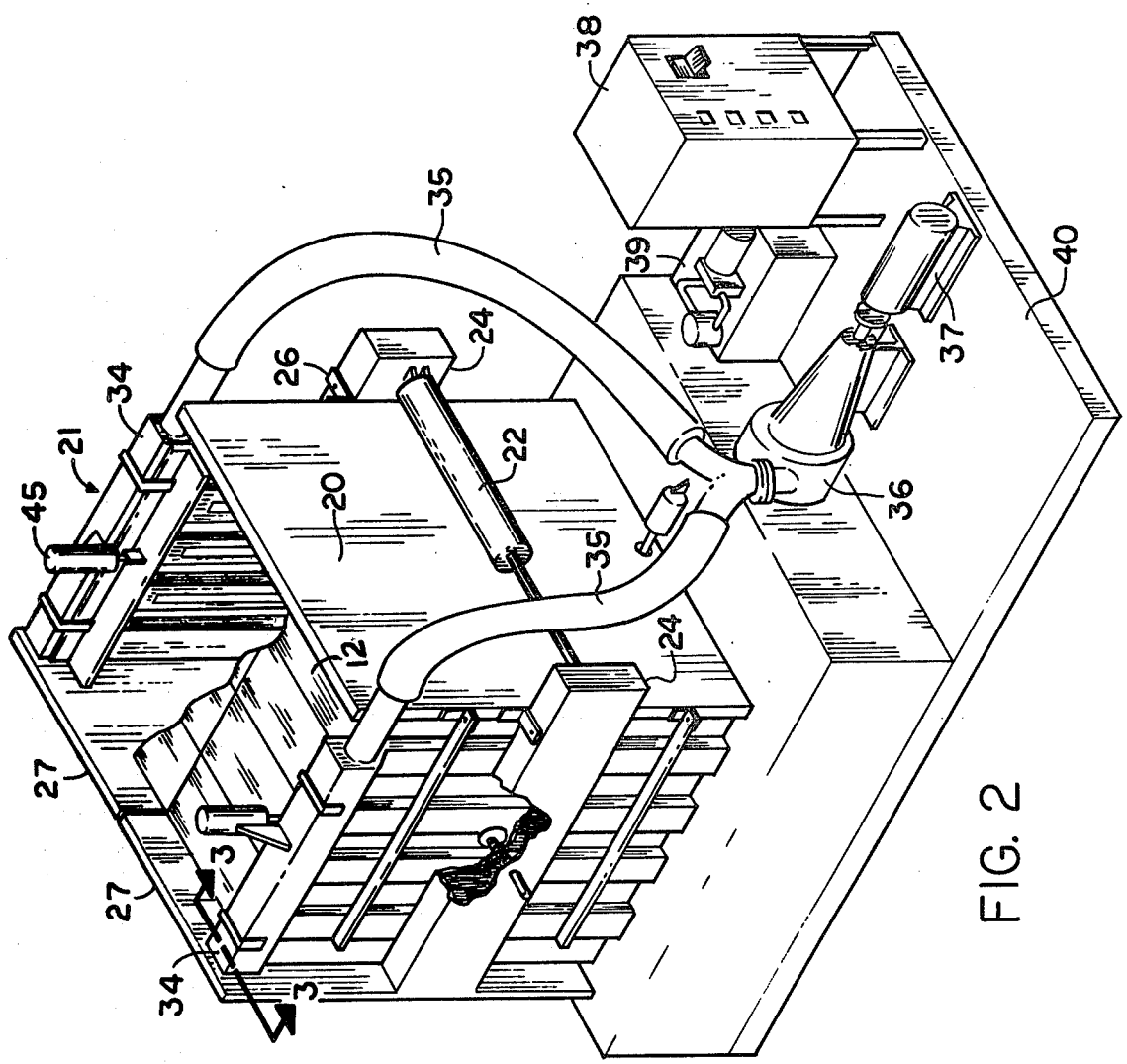
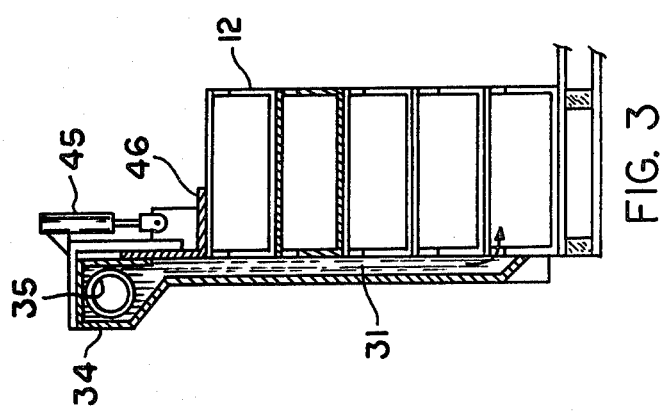
FIG. 2
FIG. 3

LIQUID ICE INJECTION SYSTEM

FIELD OF THE INVENTION

This invention relates to a system for injecting cooling fluid into cartons of produce stacked on pallets.

BACKGROUND OF THE INVENTION

Produce such as vegetables and fruit are packed into paperboard cartons for shipment to the market. As soon as practical the produce is cooled to remove the field heat for better preservation. Normally a mixture of water and ice, commonly called liquid ice, is pumped into the cartons for depositing the ice over the produce to remove heat and maintain the contents at a temperature below 40 degrees Fahrenheit during shipment. The ice not only cools the produce but also slows evaporation from the fruit or vegetables.

One previous method of injecting the liquid ice into the carton is disclosed in U.S. Pat. No. 4,249,388 issued on Feb. 10, 1981 with Daniel Burns as Inventor and entitled Automatic Liquid Ice System. This system requires that each carton be individually filled with liquid ice by the insertion of a nozzle through the open top of the carton.

An improved method for chilling produce is described in U.S. Pat. No. 4,380,908 issued on Apr. 26, 1982 with Richard V. Crabb, Jr. as Inventor and entitled Method and Apparatus for Chilling Produce. Described in this application is a system for injecting liquid ice into a stack of cartons containing produce. The cartons are stacked on a pallet and the loaded pallet is positioned between a pair of plates or frames having a plurality of fluid conduits therein through which is pumped liquid ice. These conduits align with the handhold openings in the cartons and liquid ice pumped through these conduits is forced into the cartons and over the produce. Thus the produce-filled cartons are moved into the icing station in pallet loads and are iced at one time, thereby saving both labor and time.

It is the purpose of the present invention to provide an improved chilling system having a self-contained apparatus for injecting coolant into cartons stacked on pallets.

SUMMARY OF THE INVENTION

A semi-automatic system for injecting liquid ice or other coolant fluid into a stack of containers comprising an apparatus having four sidewalls sized to fit around the carton stack with at least one of the sidewalls being movable to allow the insertion and removal of the carton loaded pallet. Positioned beneath a conveyance for supporting the pallet is a mixing tank containing the liquid ice mixture and catching the excess liquid ice as the mixture is injected into the carton stack. Means are provided also for holding the cartons against movement due to the pressured liquid ice.

DESCRIPTION OF THE DRAWINGS

FIG. 2 shows the system of FIG. 1 in the closed position for injecting liquid ice into a carton stack partially shown; and FIG. 3 is a cross-sectional view along the line 3—3 of FIG. 2 showing a portion of the pallet and cartons in place for icing.

DESCRIPTION OF THE INVENTION

Figure 1:
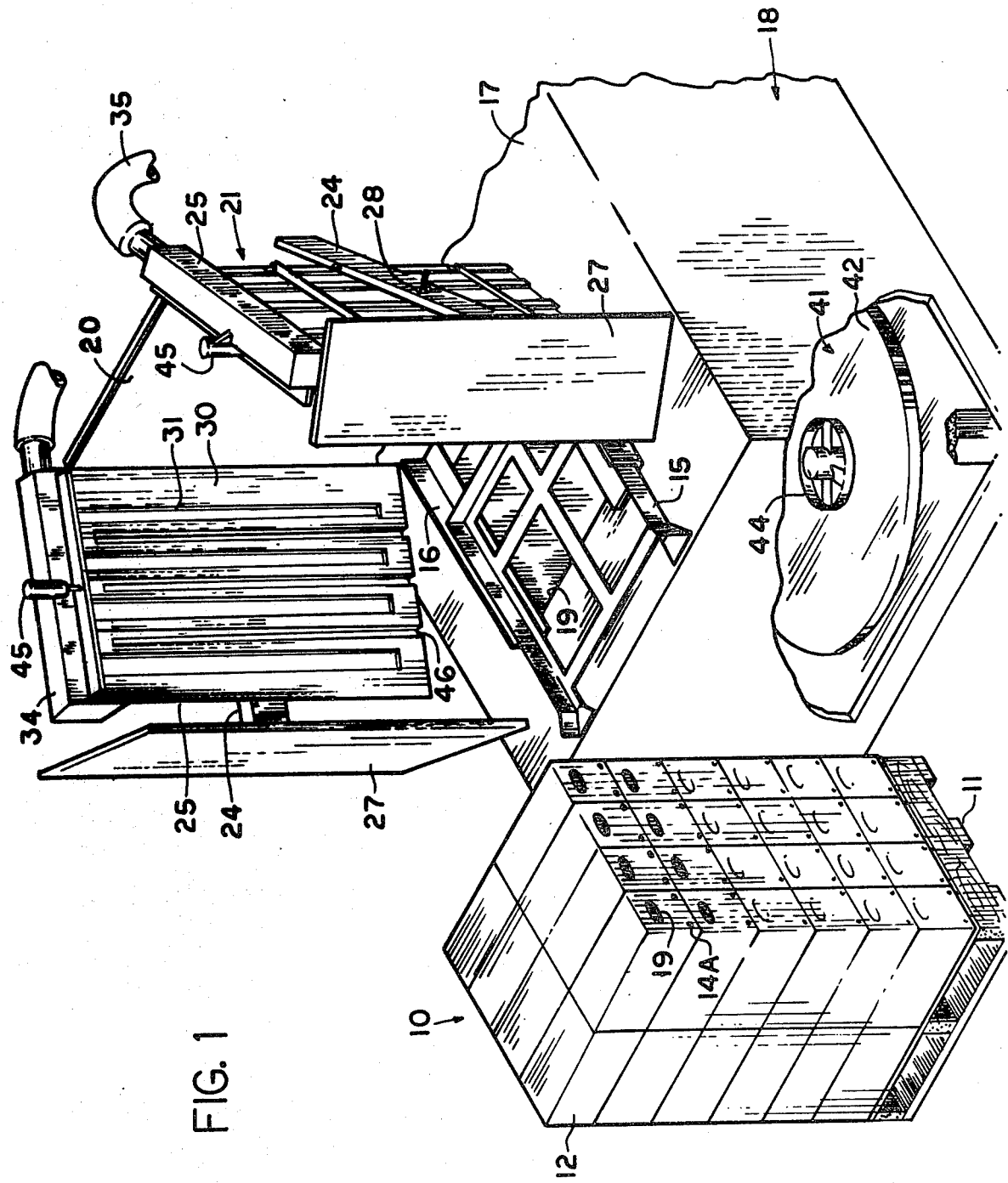
FIG. 1 shows a partial view of a first embodiment of a liquid ice system with portions broken away for better illustration of the subject invention.

In FIG. 1 is shown a first embodiment of the invention used for the purpose of injecting a coolant such as liquid ice into a stack 10 of cartons supported on a pallet 11. Each individual carton 12 is of a predetermined size and includes handhold openings 14 in each end for ease of handling. Such cartons are used for the shipment of produce and fruit, primarily onions, celery, asparagus and the like. Preferably the cartons are packed in the field and transported to a central location for icing and loading onto long distance transports such as trucks or trains.

For ease of handling and to protect the produce, it is better if the cartons are packed in the field. To preserve the produce and limit dehydration it is preferred that ice be packed into the cartons and around over the produce and the produce be shipped in refrigerated containers. As pointed out before, it has been a rather laborious task to pack ice into the individual cartons before the invention disclosed in the previous identified U.S. patent application No. 4,380,908 was conceived. However this invention has made possible a reduction in the amount of ice used and with the high cost of energy, ice has become a significant cost in the overall packing operation.

The invention as illustrated in FIG. 1 comprises an apparatus 13 for injecting liquid ice into each of the cartons in unison and in a manner such that the overflow is reclaimed. For this purpose the loaded pallet 11 is placed on a pallet tray 15 which rests on tray guides 16 supported level with the top wall 17 of a mixing tank 18. Preferably the mixing tank and associated equipment are made of a non-corrosive material to limit contamination of the liquid.

In this embodiment a pallet is loaded onto the pallet tray or support 15 by a forklift truck which moves it over an opening 19 in the top wall thereof. While the invention is described for use with pallet loaded cartons, it is just as useful with containers of any type, whether on a pallet or not, so long as openings exist for entry of the coolant. The pallet is moved backwards on the tray until it contacts a rear wall 20 of the injector 21. This rear wall is stationary and supports an actuator 22 extending to the clamp assemblies 24 fixed to each of the sidewalls or frame 25. The actuator 22 comprises a hydraulic cylinder which can be contracted or expanded in length to pivot the clamp assembly arms 24 about the pivots 26. Such action causes the doors 27 to close to the position shown in FIG. 2 wherein they are shifted into contact with the carton stack or open to the position shown in FIG. 1 for insertion or removal of the carton stack. Carried on the ends of these arms are the two door half-sections 27 forming the front wall of the injector. Compression springs 28 extending between the midpoint of the arms 24 and the sidewalls 25 move the sidewalls into close contact with the carton stack after the actuator 22 has been energized to close the sidewalls and front wall sections.

Each of the sidewalls 25 includes in the inner surface 30 thereof a plurality of grooved channels or ports 31 extending vertically in alignment with the handhold openings 14 in the cartons. Connecting with the top end of these channels is a manifold 34 extending along the top outer edge of each of the two side walls 25. This hollow manifold has openings (FIG. 3) in the bottom wall thereof corresponding to the channels 31 on the inner surface of the sidewalls 25. These manifolds connect with a feed hose 35 leading from a pump 36 driven by a motor 37 (FIG. 2). The apparatus 13 is controlled by a control panel 38. A hydraulic power supply 39 is also positioned on the back platform 40 of the apparatus. The overall control automatically cycles the icing apparatus through the icing sequence once initiated. Such initiation preferably is started by a radio controller (not shown) that is activated by the fork lift operator.

To initiate an icing operation a combination of water and ice is placed in the tank 18. The hydraulic power supply 39 is energized to supply power to a hydraulic motor (not shown) driving a rotor 41 in the bottom of the tank. The rotor comprises a circular disc 42 having a center opening in which is fixed a turbine blade assembly 44. Thus the water and ice combination, i.e. liquid ice, is caused to circulate through the turbine assembly, beneath the disc and throughout the tank. By positioning this disc in the bottom of the tank, circulation of the overall bulk of liquid ice within the tank is effected and, because of the low temperature of this mixture, is necessary to prevent stratification and solidification.

A pallet 11 is placed on the pallet tray 15 and pushed back on this transport means into position on the tray guide 16. Thereafter the actuator 22 is energized to close the side walls 25 against the cartons stacked on the pallet and the front door sections 27 to move together. Thereafter the springs 28 cause the side walls to squeeze closely into contact with the carton walls. The actuators 45, positioned at the top of each side wall 25, are each energized to move downward an L-shaped flange 46 against the top edge portion of the carton. The function of this flange is to serve as a means to clamp and seal against the escape of liquid ice from around the edge of the top of the carton stack and to hold the carton stack down so the pressured mixture does not force the top cartons upward. At this time the pump 36 is energized to pump liquid ice from the tank 18 through the connecting hoses 35 to the manifolds 34. The liquid ice flows into the channels 31 in the side walls and from there into the cartons through the openings 14. After liquid ice has been permitted to flow for a predetermined time or until it is detected that the cartons are full.

Once the cartons become full of liquid it is necessary to return the excess liquid to the mixing tank. To assist this return flow, the vertical channels 46 are provided, positioned between the channels 31 and opening only at the bottom of the side walls. These channels are spaced apart a sufficient distance so as not to align with the handhold openings in the cartons and otherwise allow a direct flow of coolant from the cartons. Then as the cartons fill the coolant begins to run out from the carton through drain holes 14A into channels 46. These channels provide a vertical path for the coolant to flow downward and through the opening 19 into the holding tank with the tank top wall catching and guiding the coolant. At the completion, the front end side doors are then pivoted open for removal of the carton stack.

Thus it can be seen that there is provided a compact automated system for icing produce in cartons stacked on a pallet. The normal time for this operation is between 1 and 2 minutes, only a fraction of the time previously needed when the cartons are iced individually.

Also while the coolant has been described as liquid ice, the system can be adapted for use with other coolants such as cold water, etc., with equally beneficial results.

The Invention claimed is:

1. A system for injecting a coolant into a plurality of produce cartons stacked together and having sides with openings therein, said system comprising:
   a holding tank for containing the coolant and having a top opening,
   a support for holding said carton stack in a position above said holding tank and over said top opening,
   a frame of sufficient size to enclose one side of said carton stack and including a frame side wall facing the carton sides having inwardly facing ports therein aligning with said carton openings,
   means to shift at least some of said frame side walls into contact with said carton stack together such that said side walls enclose said carton stack,
   means to pump coolant from said holding tank into said ports and through said carton openings into the cartons to cool the produce therein, and
   drain means for catching and guiding any overflow coolant back into said holding tank.

2. A system as defined in claim 1 including means clamping against the top of said carton stack to hold the cartons in place while the coolant is being pumped therein.

3. A system as defined in claim 1 including means to maintain the coolant in said holding tank circulating to prevent solidification thereof.

4. A system as defined in claim 1 including transport means for shifting said carton stack to a position over said holding tank.

5. The method of pumping coolant into cartons in a stack and each having holes in a side, said method comprising the steps of:
   providing a mixing tank for said coolant having an opening in the top wall thereof,
   providing a frame having a wall of sufficient size to cover one side of the carton stack,
   positioning said frame over said holding tank,
   positioning said carton stack over said holding tank,
   moving each of said frame into contact with a side wall of said carton stack,
   providing passages in said frame aligning with the side holes in said cartons,
   pumping coolant through said passages in the frame and into said cartons in the stack, and
   catching any overflowing coolant and returning it to said mixing tank.

6. The method of claim 5 including the step of:
   providing an opening in a top wall of said mixing tank to allow the overflowing coolant to flow back into said tank.

7. The method as defined in claim 5 including the step of:
   exerting pressure on the top of said carton stack while the coolant is being pumped through the side walls to prevent movement of said cartons due to the coolant.

8. The method as defined in claim 5 including the step of:
   providing passages for returning the coolant back to the mixing tank.

* * * * *